United States Patent
Komaromi

(10) Patent No.: US 7,984,476 B2
(45) Date of Patent: Jul. 19, 2011

(54) REUSABLE APPLICATION SOFTWARE FOR GENERATING INTERACTIVE TELEVISION APPLICATIONS

(75) Inventor: John Komaromi, West Palm Beach, FL (US)

(73) Assignee: The DIRECTV Group, Inc., El Segundo, CA (US)

( * ) Notice: Subject to any disclaimer, the term of this patent is extended or adjusted under 35 U.S.C. 154(b) by 1539 days.

(21) Appl. No.: 10/319,046

(22) Filed: Dec. 13, 2002

(65) Prior Publication Data

US 2003/0170004 A1    Sep. 11, 2003

Related U.S. Application Data

(60) Provisional application No. 60/362,901, filed on Mar. 8, 2002.

(51) Int. Cl.
*H04N 7/16* (2011.01)
(52) U.S. Cl. ............. 725/135; 725/44; 725/52; 715/825
(58) Field of Classification Search ............... 725/49, 725/52, 44, 135; 715/810–845
See application file for complete search history.

(56) References Cited

U.S. PATENT DOCUMENTS

| 5,500,881 | A  | * | 3/1996 | Levin et al. ................. 717/141 |
| 5,764,982 | A  | * | 6/1998 | Madduri ..................... 719/330 |
| 5,929,857 | A  | * | 7/1999 | Dinallo et al. ............... 715/840 |
| 6,201,536 | B1 | * | 3/2001 | Hendricks et al. ........... 715/716 |
| 6,681,395 | B1 | * | 1/2004 | Nishi ............................ 725/45 |

FOREIGN PATENT DOCUMENTS

EP    0944254    9/1999

* cited by examiner

*Primary Examiner* — Brian T Pendleton
*Assistant Examiner* — Olugbenga Idowu

(57) ABSTRACT

The invention is an efficient computerized method for generating generic scenes for interactive satellite television applications, comprising the steps of maintaining a database of individual scene resources of different types, and obtaining a list of scenes comprising the scene resources via at least one loop for each scene resource. The invention only updates those scene resources that have been updated since the last compilation of scene resources. The scene resources include one or more of the following list: button, text box, static display, animation, photograph, visual element, audio clip and other computer gadget. The invention alleviates the need for writing new source code for each television application.

12 Claims, 3 Drawing Sheets

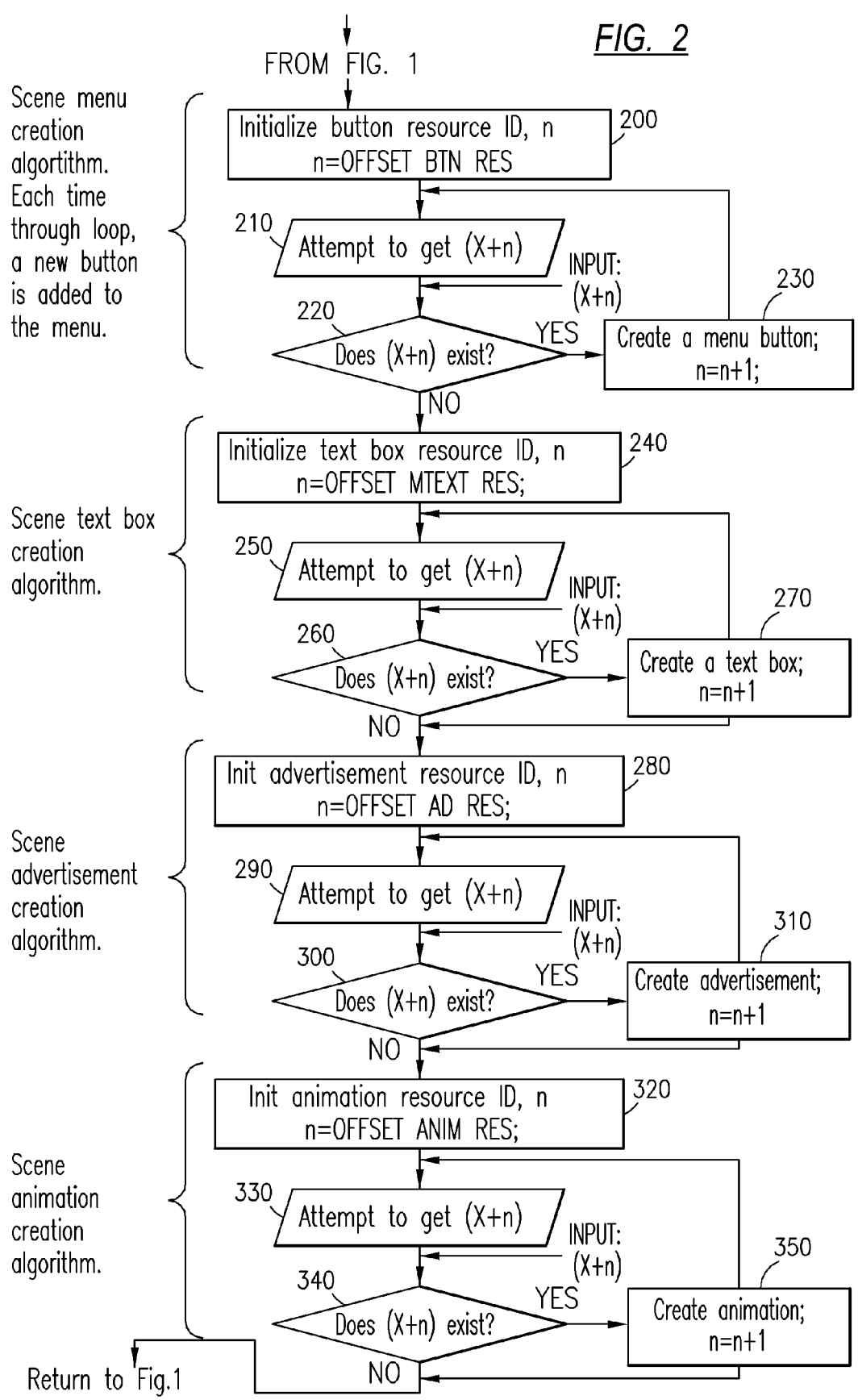

```
makefile

APPL_NAME = Tester
APPL_ID = 20120 include Part1.mak

DIRBUILD_OPTIONS = -n GenericApp2 -i $ (APPL_ID) -a all_authorization-
no_clean_osd_memory \
        $(OBJ_DIR) / GenericApp2.otv -mn GET_NAVLOG -mt code -mf +autorun
        GetNavLog.otv -mn GET_NAVLOG -mt code -mf + autoload \
        SceneRes.res -mn SCENE_RES -mf +relocate+autoload \
        $(AUD_DIR) /Green.mp2 - mn FOCUS_MP2 -mf +autoload \
        $(AUD_DIR) /Yellow.mp2 -mn SELECT_MP2 -mf +autoload \
        $(VID_DIR) /PRINCIPAL.mpg -mn MPEG1 -mf +autoload \
        $(VID_DIR) /CINEMAX_b.mpg -mn MPEG2 -mf +autoload \
        $(VID_DIR) /HBO_b.mpg -mn MPEG3 -mf +autoload \
FLWBUILD_OPTIONS = -r $(APPL_RATE) -fm DSS -NTSC -W -dir $(OBJ_DIR)
/GenericApp2.dir \
        DIRECTORY       -b 0 \
        GET_NAVLOG      -justafter \
        SCENE_RES       -justafter \
        MAIN            -justafter \
        FOCUS_MP2       -justafter -nopp \
        SELECT_MP2      -justafter -nopp \
        MPEG1           -justafter -nopp \
        MPEG2           -justafter -nopp \
        MPEG3           -justafter -nopp \ include Part2.mak
        $OBJ_DIR /Scene.o: Scene.c Scene.h \
        $(PIX_DIR) /hbo_plus_focus.pix
        $(PIX_DIR) /hbo_focus.pix
        $(PIX_DIR) /cinemax_focus.pix
        $(PIX_DIR) /TestAd.pix
```

FIG. 3

REUSABLE APPLICATION SOFTWARE FOR GENERATING INTERACTIVE TELEVISION APPLICATIONS

RELATED APPLICATION

The present application claims priority to provisional application Ser. No. 60/362,901 (PD-202024) filed on Mar. 8, 2002, incorporated by reference herein.

COMPUTER PROGRAM LISTING APPENDIX

Attached to this application is a computer program listing appendix submitted on a compact disk. The material on the compact disk is incorporated by reference. The total number of disks included in this application, including the duplicate, is two (2).

BACKGROUND OF THE INVENTION

1. Field of the Invention

The invention generally relates to a method and system of providing easy-to-use generic and reusable software for generating interactive television applications. Specifically, the invention relates to a program which incorporates nested loops to obtain elements for a selected scene from an efficiently updatable comprehensive database of scene elements.

2. Description of the Prior Art

Satellites have significantly impacted the television industry. From orbit, satellites transmit a usable signal over a broad footprint. The large geographical coverage of satellites makes it possible to serve millions of people with a single satellite.

The basic components of a satellite system are one or more transmitting earth stations, the uplink, the satellite, the downlink, and one or more receiving earth stations. The communications satellite is a radio relay operating in space for ten or more years without the need for on-site servicing or adjustment. Satellites contain transceivers that receive and transmit signals, including video programming, telephone calls and data. They operate in a vacuum at a location exposed to extreme temperature changes.

Generally speaking, for interactive television, a program is put in a server by a programmer, beamed up to a satellite and then beamed down to a set-top box in connection with a monitor. Before a program arrives in the set-top box as an interpreted code, it is usually in the form of a .MUX file. A .MUX file is a type of file which contains the interpreted code in a transport protocol understandable by the set-top box. Once inside the set-top box, the .MUX file's application component is reassembled and interpreted as it runs. Input from a user by a remote, keypad or similar device is how the user interacts with the application. In some cases, data may be transmitted via a telephone line analog to a remote server.

Interactive television via satellite provides users with various applications, such as the use of weather guides, TV guides, language or signal options, games, the selection of movies, or similar purposes, appearing as screens on a user's monitor. For example, a television program guide might appear with a clickable ad on a user's monitor. Using a device such as a remote, a user can click on an item, or gadget, such as an ad, and get additional information on the product advertised. There may be more than one clickable item on the screen. There may also be a scroll bar or other devices for input from the user. Clicking or other user input may provide animation, sounds or other effects, or display a new screen.

Current interactive television applications require separate source code to be written for each application, which is unnecessarily time-consuming and can be error prone. There is no "shared" source code available which can be used for different applications, or the creation of a database of page elements or pages.

There is no single system or method that has source code independent of the resources required to make an application unique, thereby allowing the application to be reusable.

There is no single system or method that allows trivial changes to pre-made files to generate a unique interactive television application screen.

SUMMARY OF THE INVENTION

The present invention provides an application to generate interactive television applications for satellite television platforms. Prior to this invention, applications were developed by writing new source code for each application. The prior art source code attempted to load gadget resources needed to build a particular scene's gadget tree, which is the core of a satellite television system's message driven application. If a particular resource was not found, the gadget tree could not be built, and the application failed to load. Thus, each application had tailored source code to reflect which resources should be found and loaded to successfully build the tree.

Unlike the prior art, the present invention rejects the conventional approach to building gadget trees by making absolutely no assumptions on the availability of the resources. Instead, the source code of the present invention searches through a specified, created and filled list of all possible resources, but acts only upon those which are found. The search through the resources is identifier-based, and all possible elements of a scene, including its resources and gadgets for interaction with a user, are predefined with unique identifiers. As each resource is found by its identifier, the corresponding element is created and attached to the gadget tree. If the resource is not found, then the source code assumes that particular element for that particular scene does not exist, and therefore does not attempt to create that element for the scene. When the search is complete, customized gadget trees have been built, one for each scene. Thus, a customized application has been dynamically created.

By altering several resource files and a compiling, program-creating file such as a makefile, unique applications can be created using the same source code.

A makefile is used with the "make" utility to determine which portions of a program to compile. A makefile is basically a script that guides the make utility to choose the appropriate program files that are to be compiled and linked together. The make utility keeps track of the last time files were updated so that it only updates the files containing changes. However, all of the files that are dependent on the updated files must be compiled as well, which can be very time-consuming. With the help of makefile, the make utility automates this compilation to ensure that all files that have been updated—and only those—are compiled and that the most recent versions of files are the ones linked to the main program, without requiring the user to perform the tasks separately.

A makefile contains three types of information for the make program: a target (the name of what the user is trying to construct); the rules (commands that tell how to construct the target from the sources) and a dependency (the reason that the target should be constructed, which is usually because it is out of date in respect to its components). To create a makefile, the user makes a file containing shell commands and names it "makefile." Shell commands are commands made by a programmer through an interactive graphical user interface. The commands are executed according to the rules in the makefile when the user types "make" while in the directory containing the file. A makefile can include a two part make program into one. A make program can be identified with the ".mak" suffix.

In the preferred embodiment, the invention supports up to five (5) scenes for interactive television applications. Each scene is capable of supporting up to five (5) buttons, a text box, a placard that may be used for advertisement, and an animation. Each button has an associated action when selected. For example, the activation of a button may display a new scene, change the background colors or music, or update the text in a text box. More actions, gadgets and customization may be added. as preferred by the user. These enhancements require trivial changes to the source code, since they are a matter of merely adding resource types to search for, and defining newly added resource identifiers to the scene-building program. Although testing has established that over 40 different applications may be established, there is no reason to believe that the number of different possible applications should be limited at all. In addition, this invention reduces the amount of time required to create an interactive television application.

It is therefore an object of this invention to provide code independent of the resources required to make an application unique, thereby allowing the scene forming programming to be reusable.

It is further an object of this invention to provide a database of scene elements for the creation of scenes, and to provide a comprehensive library of scenes for display on a monitor.

It is further an object of this invention to provide an efficient means for updating a library of scene elements and a library of scenes, so that only new elements are compiled, and only those scenes using those elements are compiled.

It is also an object of this invention to provide programming wherein trivial changes to pre-made files to generate a unique interactive television application screen.

In accordance with these and other objects which will become apparent hereinafter, the instant invention will now be described with particular reference to the accompanying drawings.

BRIEF DESCRIPTION OF THE DRAWINGS

FIG. 2 is a flow chart depicting the logic of the preferred embodiment for obtaining the scene elements for a scene to be displayed on a monitor.

FIG. 3 is selected language of the preferred embodiment of the program of the invention including two makefiles.

Figure 1:
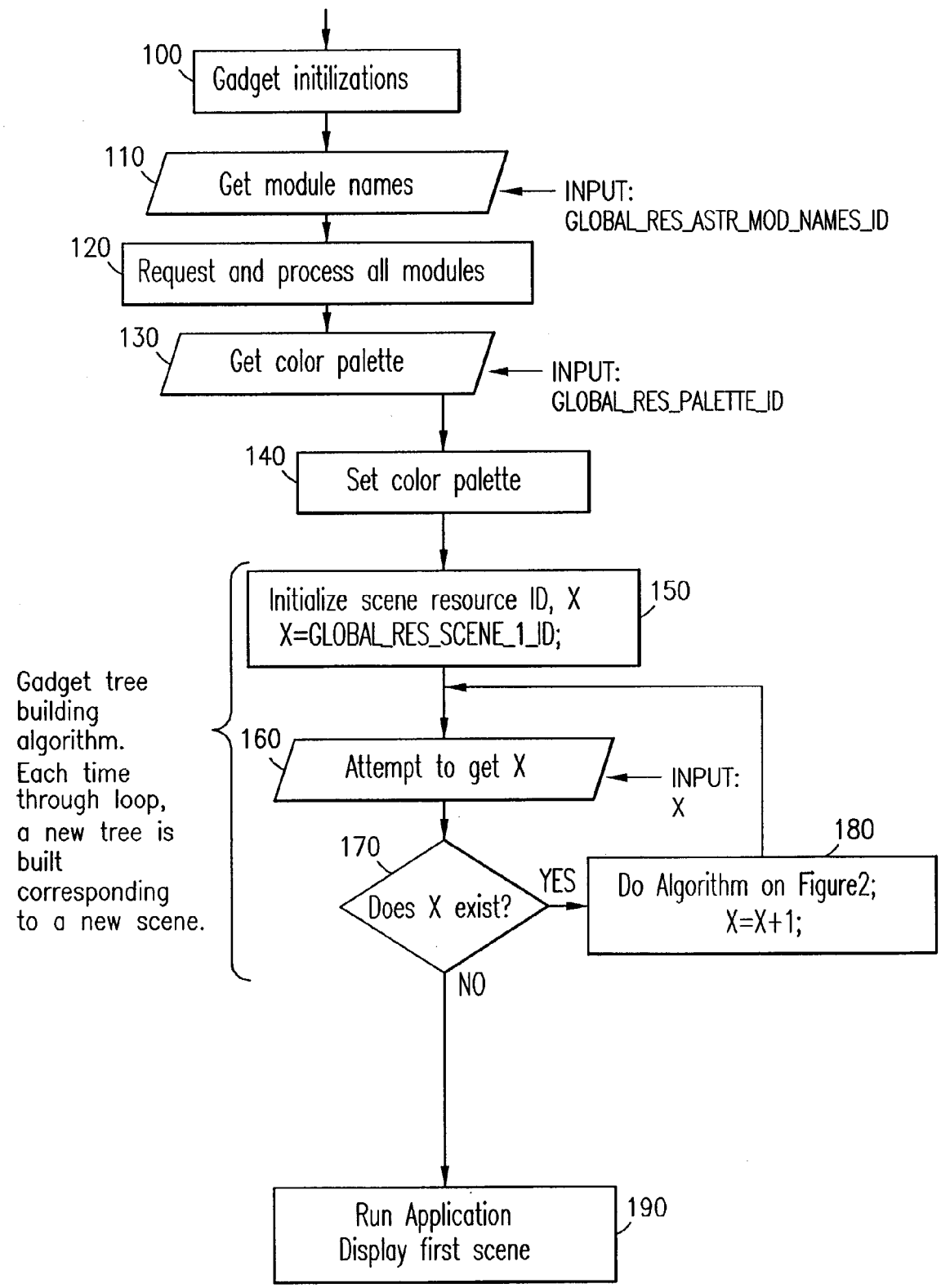
FIG. 1 is a flow chart depicting the logic of the steps taken to build a typical television application to be viewed on a monitor.

DESCRIPTION OF THE PREFERRED
EMBODIMENT

The invention is the provision of generic interactive television elements for application scenes that can be used repeatedly for different specific applications. Furthermore, the invention is the provision of several fully-formed scenes for display on a monitor. The programming logic of this invention is shown generally in FIG. 1 at 10.

The content included in a specific application may be beamed from a satellite to a user's set-top box. However, the generic components for a scene and several scenes can reside in the set-top box of the user. The components and the scenes may also be transmitted to the set-top box via satellite by the programmer or from a resident program in a server electronically connected to the satellite. Before transmission, the program is transformed to a .MUX file, and subsequently interpreted by the set-top box.

First, as shown in FIG. 1, application gadgets are initialized in step 100. Gadgets are user interface elements that the programmer may combine at run-time to build scenes with elements such as user interfaces. In step 110, scene names or module names are obtained. The module names are input by the user or are a defined list provided by the programmer. In step 120, the relevant modules are requested and processed, using the gadgets initialized in step 100.

Next, if the programmer desires, and to make the application more interesting and easier for the user to see, a color palette is used. The color palette is obtained or input at step 130. Once obtained, the color palette is set at step 140.

Gadget trees are then built using an algorithm that provides, in each iteration through the loop, a new gadget tree corresponding to a new scene. At each iteration of the algorithm, the program forms a scene in memory using another algorithm that adds buttons and other desired features as described in FIG. 2.

First, the variable corresponding to the resources used to build a scene is initialized; then, it is given a value unique for each scene at step 150. Several scenes are then built in series as shown by the search for the value of the identifier at step 160, the confirmation that the identifier exists at step 170 and the incremental increase of the identifying variable at step 180. After all of the scenes are created, the application is then run, and the first scene is displayed at step 190. Also at step 190, the program waits for input from the user interface to go to another scene, if the user so desires.

In FIG. 2, the logic for building the elements to each scene is shown. In this flowchart, the resources for a particular scene that have identified with a scene identifier are assembled. As shown, the variable identifying the button resource is initialized at step 200, and, if required for a particular scene as illustrated at step 210, a button is added to the menu of the scene. The variable identifying the button is incrementally adjusted, and more buttons are added as required. Eventually, as shown in step 220, the increment exceeds the number of buttons required, and the program goes on to the next step.

Next, if required, one or more screen text boxes are created as shown in steps 240 through 270. In a manner similar to the addition of buttons described above, text boxes are now added to the scene through an iterative loop. Likewise, in steps, 280 through 310, static scenes such as advertisements are added to the scene. Finally, animation can be added to a scene through a separate logic sequence as shown in steps 320 through 350.

The shown order of iterations is the one which is preferred. However, this process need not be performed in the order shown here. Also additional element may be added to a scene, such as photographs or other visual or audio elements.

The preferred embodiment of the programming logic described herein and in FIGS. 1 and 2 is illustrated in the makefile files in FIG. 3.

In the preferred embodiment, the scene forming program is split into distinct parts for easier administration: Part1.mak and Part2.mak. Part1.mak is in two sections. First, using a compilation file, such as the one named GenericApp2.c described in the Appendix, Part1.mak makes a file that builds a directory of all of the generic needs for displaying a scene in general as well as the options available for the building of scenes in general. Then Part1.mak builds a database of generic scenes to fill the directory.

GenericApp2.c also does the preparation work for displaying a scene and delegates the activation of a scene upon a user's action, such as clicking on a button. Genericapp2.c also acts as a subroutine which creates all of the scenes as shown in steps 150-180 in FIG. 1. Thus, in essence, Genericapp2.c handles the function of the logic in FIG. 1, in the following routine:

```
TRACE ("Creating scenes ...") ;
for ( I = 0; I , g_nNumScenes; I++ )
{
    g_aScenes [ i ] = O_gadget_new (     SCENE_CLASS_ID,
GLOBAL_GAD_SCENE_1_ID + i, .
        (SCENE_RESOURCE*) O_rm_find( SCENE_RESOURCE_ID,
        GLOBAL_RES_SCENE_1_ID + i ) ) ;
    ASSERT ( g_aScenes[i ] != NULL ) ;
```

Part2.mak builds the individual scenes from the options created in Part1.mak. Part2.mak uses a file such as the one referenced as Scene.c in the Appendix to compile and build the scenes to be displayed. Thus Scene.c handles the function of the programming logic in FIG. 2, in the following routine (omitting the non-functional comments):

```
void _SceneOnUIMSNew ( Scene* this, o_message* pMsg )
{
    SCENE_RESOURCE*              pSceneRes;
    pSceneRes = (SCENE_RESOURCE*) pMSg->INFO_RESOURCE;
    ASSERT ( pSceneRes != NULL ) ;
    this->m_oKeyMask = pSceneRes->oKeyMask;
    this->m_nResourceLocator = pSceneRes->nResourceLocator;
    this->m_timerHackDelay = O_timer_new
    ( TIMER_HACK_DELAY ) ;
    TRACE ( "----------------------------------------------" )
    TRACE ( Searching buttons on this->m_nResourceLocator: %d,
    this-> m_nResourceLocator ) ;
    if ( (void*) O_rm_find ( 0, this->m_nResourceLocator +
    OFFSET_BTN_RES ) != NULL
        _Scene_CreateMenu ( this ) ;
    if ( (void*) O_rm_find ( 0, this->m_nResourceLocator +
    OFFSET_MTEXT_RES ) != NULL )
        _Scene_CreateTextBox ( this ) ;
    if ( (void*) O_rm_find ( 0, this->m_nResourceLocator +
    OFFSET_AD_RES ) != NULL )
        _Scene_CreateAdvertisement ( this ) ;
    if ( (void*) O_rm_find ( 0, this->m_nResourceLocator +
    OFFSET_ANIM_RES ) != NULL )
        _Scene_CreateAnimation ( this ) ;
}
```

While this routine illustrates the creation of four different types of gadgets, other types of gadgets, such as drop-down boxes may be created the same way. Also, more or less than four gadgets may be created using the same methodology.

In the type of programs illustrated herein, preferably using the C programming language, it is a function of the program to reconfigure updated resources, and only updated resources. If no update has occurred, then the file including the scene elements is not reconfigured by the program. Thus the update of the program is more efficient, and takes fewer computer resources than previously used in the prior art.

As shown within GenericApp2.c and the Scene.c files referenced in the Appendix, there are two resource files associated with the general makefile: "GlobalRes.rc" and "SceneRes.rc". "GlobalRes.rc" provides all of the resources, including the general variable definitions and, where required, variable assignments for variables needed in any scene in general. For example, GlobalRes.rc includes the palette needed for all scenes, as well as the clicking noises generated whenever a user hits a button for the next scene or for exiting the currently displayed application.

Similarly, "SceneRes.rc" which is also referenced in the Appendix builds the resources for all of the scenes, generally making each scene unique. For example, this file includes font and color data for a specific scene. This file, in creating all the scenes, is what provides the aspects, visible and latent, which make one scene different from another.

For the program shown, it is preferred that the program creating the library of scenes is input from a server and transmitted to the set-top box as a .MUX file, where the set-top box makes a final compilation, runs the program, and stores the scenes to be displayed.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A computerized method for generating generic scenes for interactive satellite television applications, comprising:
    a) maintaining a database of all available individual interactive scene resources of different types at a remote server, wherein the individual interactive scene resources are other than program guide resources;
    b) providing at least one resource file that specifies scene elements for each of the available individual interactive scene resources for multiple scenes of a first unique interactive television application at the remote server;
    c) executing a common scene forming program at the remote server on each resource file which acts only on those interactive scene resources identified as scene elements present in the at least one resource file to build a customized interactive gadget tree for each scene, and
    d) compiling the customized interactive gadget tree files at the remote server to form the executable first unique interactive satellite TV application for displaying linked pre-built scenes wherein compiling occurs when those interactive scene resources identified as scene elements present in the at least one resource file have been altered since a prior compilation of the customized gadget tree files,
    e) transmitting the executable first unique interactive satellite TV application via satellite to a plurality of users' set-top boxes, and
    f) repeating b through e for different resource files to form and transmit at least a second executable unique interactive satellite TV application for displaying different linked pre-built scenes, wherein the first unique interactive satellite TV application and the at least second executable unique interactive satellite TV application are displayed based on selections by the remote server.

2. The method of claim 1, further comprising:
    running the unique interactive television application at the set-top box to obtain a specific pre-built scene to be displayed on a monitor, and displaying the pre-built scene on the monitor.

3. The method of claim 2, wherein obtaining a specific pre-built scene is repeated for multiple scenes and the step of displaying a pre-built scene is repeated among at least some of the multiple scenes as each specific pre-built scene is accessed via its customized interactive gadget tree.

4. The method of claim 1, wherein maintaining a database further comprises updating at least a portion of the interactive scene resources, and the step of compiling the customized gadget tree files is selectively taken for those scenes incorporating the newly updated scene resources.

5. The method of claim 1, wherein the interactive scene resources comprise at least one of the following: button, text box, static display, animation, photograph, visual element and audio clip.

6. The method of claim 1, wherein the scene forming program builds the customized interactive gadget tree files by:
performing a loop though all scenes, and for each scene, performing a series loop through all different types of interactive scene resources in the data base, and for each type of interactive scene resource,
performing a nested looped through all scene elements of that type identified in the resource file to create the customized interactive gadget tree file.

7. The method of claim 6, wherein the interactive scene resources comprise at leash two of the following: button, text box, static display, animation, photograph, visual element and audio clip.

8. The method of claim 7, wherein at least one of the interactive scene resources has two identified scene elements.

9. In an interactive television system having a monitor, a set-top box and a selection device, a method of providing a plurality of scenes on the monitor, the method comprising:
providing a database of all available generic interactive scene resources of different types at a remote server, wherein the individual interactive scene resources are other than program guide resources;
providing at least one resource file that specifies scene elements for each of the available generic interactive scene resources for multiple scenes of a unique interactive television application at the remote server;
executing a common scene forming program at the remote server to search, using a series of nested loops, the database and act only on those interactive scene resources identified as scene elements present in the at least one resource file to build a customized interactive gadget tree file for each scene,
compiling the customized interactive gadget tree files at the remote server to form the executable unique interactive satellite TV application wherein compiling occurs when those interactive scene resources identified as scene elements present in the at least one resource file have been altered since a prior compilation of the customized gadget tree files,
transmitting the executable unique interactive satellite TV application via satellite to a plurality of users' set-top boxes,
running the unique interactive television application at the set-top box to obtain a specific pre-built scene to be displayed on a monitor; and
displaying each specific pre-built scene selected through the selection device in accordance with the customized gadget trees, wherein the unique interactive satellite TV application is displayed based on selections by the remote server.

10. The method of claim 9 wherein using a series of nested loops to search the database to build the gadget tree files comprises:
performing a loop through all scenes, and for each scene, performing a series loop through all said different types of interactive scene resources in the database, and for each type of interactive scene resource, performing a nested looped through all scene elements of that type identified in the resource file to create the customized interactive gadget tree file.

11. A system for generating unique interactive satellite television applications, comprising:
a database of all available individual interactive scene resources of different types at a remote server, wherein the individual interactive scene resources are other than program guide resources;
at least one resource file that specifies scene elements for each of the available individual interactive scene resources for multiple scenes of a unique interactive television application,
at least one resource file that specifies scene elements for each of the available individual interactive scene resources for multiple scenes of a different unique interactive television application,
a common scene forming program at the remote server that for each of the unique interactive television applications searches the database and acts only on those interactive scene resources identified as scene elements present in the at least one resource file to build a customized interactive gadget tree file for each said scene, and
a makefile for compiling the customized interactive gadget tree files for each said unique interactive television application at the remote server to form the different executable unique interactive satellite TV applications for displaying linked pre-built scenes wherein compiling occurs when those scene resources identified as scene elements present in the makefile have been altered since a prior compilation of the customized interactive gadget tree files, wherein
different executable unique interactive satellite TV applications are transmitted to a plurality of set-top boxes, wherein the unique interactive satellite TV applications are displayed based on selections by the remote server.

12. The system of claim 11, wherein the scene forming program builds the customized gadget tree files by:
performing a loop through all scenes, and for each scene, performing a series loop through all different types of scene resources in the data base, and for each type of scene resource, performing a nested looped through all scene elements of that type identified in the resource file to create the customized gadget tree file.

* * * * *